(12) United States Patent
Wollborg (10) Patent No.: US 9,586,441 B2
(45) Date of Patent: Mar. 7, 2017

(54) OBSTACLE TRAVERSING WHEEL ASSEMBLY

(71) Applicant: Kenan Wollborg, Inkster, MI (US)

(72) Inventor: Kenan Wollborg, Inkster, MI (US)

(73) Assignee: Ktech Concepts LLC, Inkster, MI (US)

( * ) Notice: Subject to any disclaimer, the term of this patent is extended or adjusted under 35 U.S.C. 154(b) by 110 days.

(21) Appl. No.: 14/482,289

(22) Filed: Sep. 10, 2014

(65) Prior Publication Data

US 2014/0375111 A1  Dec. 25, 2014

Related U.S. Application Data

(62) Division of application No. 13/745,067, filed on Jan. 18, 2013, now Pat. No. 8,857,920.

(51) Int. Cl.
| | |
|---|---|
| *B60B 19/00* | (2006.01) |
| *B62B 5/00* | (2006.01) |
| *A61G 5/06* | (2006.01) |
| *B62B 5/02* | (2006.01) |
| *B62B 3/14* | (2006.01) |

(52) U.S. Cl.
CPC .............. *B60B 19/00* (2013.01); *A61G 5/065* (2013.01); *B62B 5/026* (2013.01); *B60B 2900/351* (2013.01); *B62B 3/1492* (2013.01); *Y10S 280/10* (2013.01)

(58) Field of Classification Search
CPC ... B60B 19/00; B60B 19/12; B60B 2900/351; B62B 5/026; A61G 5/061; A61G 5/065
USPC ...................................... 301/5.1, 5.23; 305/1
See application file for complete search history.

(56) References Cited

U.S. PATENT DOCUMENTS

| | | | |
|---|---|---|---|
| 795,620 | A | 7/1905 | Thos |
| 1,326,679 | A | 12/1919 | Macbeth |
| 2,633,363 | A | 3/1953 | Marshall |
| 2,736,564 | A | 2/1956 | Loam |

(Continued)

FOREIGN PATENT DOCUMENTS

| | | | |
|---|---|---|---|
| AT | 510640 A2 | * | 5/2012 |
| DE | 19639836 A1 | | 4/1998 |

(Continued)

OTHER PUBLICATIONS

English machine translation of JP2002035041A (retrieved Sep. 19, 2016).*

*Primary Examiner* — Kip T Kotter
(74) *Attorney, Agent, or Firm* — Wayne State Law School Patent Clinic (57) ABSTRACT

An obstacle traversing wheel assembly can include at least one primary wheel member mounted with a primary axis of rotation and capable of rolling engagement with a supporting surface, and at least one secondary wheel member mounted with a secondary axis of rotation. The secondary wheel member can have a plurality of surface engaging protrusions which enable the wheel assembly to traverse an obstacle by imparting climbing movement to the primary wheel member in response to engagement with the obstacle. The surface engaging protrusions can be defined by rolling wheel members. The obstacle traversing wheel assembly can be incorporated on a wide variety of wheel-bearing devices, such as wheelchairs, personal transportation devices, and intravenous fluid support racks.

21 Claims, 6 Drawing Sheets

(56) References Cited

U.S. PATENT DOCUMENTS

| | | |
|---|---|---|
| 3,208,544 A | 9/1965 | Colvin |
| 4,154,315 A | 5/1979 | Rasmussen |
| 4,247,125 A | 1/1981 | Rayment |
| 4,312,417 A | 1/1982 | Dalton et al. |
| 4,421,189 A | 12/1983 | Watkins et al. |
| 4,512,588 A | 4/1985 | Cox |
| 5,427,398 A | 6/1995 | Weybrecht |
| 6,431,664 B1 | 8/2002 | Sawada |
| 7,980,335 B2 | 7/2011 | Potter |
| 8,240,407 B2 | 8/2012 | Takenaka et al. |
| 2005/0087940 A1 | 4/2005 | Ally et al. |
| 2005/0263965 A1 | 12/2005 | Barnett |
| 2007/0222165 A1 | 9/2007 | Hope |
| 2008/0018166 A1 | 1/2008 | Chang |
| 2008/0164665 A1 | 7/2008 | Chang |
| 2009/0309319 A1 | 12/2009 | Kamara et al. |
| 2011/0127732 A1 | 6/2011 | Mann et al. |

FOREIGN PATENT DOCUMENTS

| | | | | |
|---|---|---|---|---|
| DE | 102006049071 | * | 11/2007 | ............ B60B 5/02 |
| EP | 109927 A2 | | 5/1984 | |
| EP | 1738734 A2 | | 1/2007 | |
| JP | 58067574 A | | 4/1983 | |
| JP | 61146686 A | | 7/1986 | |
| JP | 06092272 A | | 4/1994 | |
| JP | 11222001 A | | 8/1999 | |
| JP | 2002035041 A | | 2/2002 | |
| JP | 2006062596 A | | 3/2006 | |
| JP | 2008162571 A | * | 7/2008 | |
| SU | 988625 A1 | * | 1/1983 | |
| TW | EP1323401 A1 | | 7/2003 | |
| WO | WO0212002 A1 | | 2/2002 | |

\* cited by examiner

OBSTACLE TRAVERSING WHEEL ASSEMBLY

RELATED APPLICATIONS

This application is a divisional of U.S. non-provisional application Ser. No. 13/745,067, filed on Jan. 18, 2013, entitled "Obstacle Traversing Wheel Assembly," which is incorporated by reference herein in its entirety.

FIELD OF THE INVENTION

The invention relates to a land vehicle having a running gear supporting a load carrier to adapt the vehicle to move over a surface for ascending or descending steps or similar obstructions, and more particularly to obstacle traversing wheel assemblies and vehicles associated therewith.

BACKGROUND

Known wheel-bearing devices are best for use on level surfaces. These known wheel-bearing devices suffer from various disadvantages including the requirement that traversing obstacles or bumpy terrain with a known wheel assembly requires more force or torque than when travelling across substantially smooth surfaces. The obstacle traversing problem associated with conventional wheels has been previously addressed by adding an additional centered climbing wheel and in another solution, adding deployable protrusions to the wheel. These configurations suffer the disadvantage of requiring a user to identify an obstacle before actually implementing the obstacle traversing device. For examples of various configurations of known wheel assemblies, see the devices disclosed in U.S. Pat. No. 795,620; U.S. Pat. No. 1,326,679; U.S. Pat. No. 2,736,564; U.S. Pat. No. 4,247,125; U.S. Pat. No. 5,427,398; U.S. Pat. No. 7,980,335; U.S. Pat. No. 8,240,407; U.S. Published Application No. 2005/0087940A1; U.S. Published Application No. 2005/0263965A1; U.S. Published Application No. 2007/0222165A1; U.S. Published Application No. 2009/0309319A1; U.S. Published Application No. 2011/0127732A1; European Published Application No. EP 13 23 401; and International Published Application No. WO 2002/12002. While each of these devices appears suitable for its intended purpose, the configurations disclosed are generally complex and costly to manufacture, while being less than satisfactory in operation. The problem with centered climbing wheel attachments, for example, is that the configuration creates an unstable condition for occupants of a wheel chair with only three points of contact increasing the likelihood of tipping the occupant out of the wheel chair when traversing a curb or other obstacle. Other configurations provide only limited ability to climb obstacles of varying vertical height. It would be desirable to provide an obstacle traversing wheel assembly with a simple construction. It would be desirable to provide an obstacle traversing wheel assembly with lower manufacturing costs. It would be desirable to provide an obstacle traversing wheel assembly with a satisfactory stable operating condition, while being able to traverse obstacles of varying vertical height.

SUMMARY

An obstacle traversing wheel assembly can include at least one primary wheel member. Each primary wheel member can be mounted with respect to a primary axis of rotation. Each primary wheel member can be capable of rolling engagement with a supporting surface. At least one secondary wheel member can be mounted with respect to a secondary axis of rotation. At least five supporting-surface-engaging portions enable the obstacle traversing wheel assembly to traverse an obstacle by imparting climbing movement to the at least one primary wheel member in response to engagement with the obstacle. The at least five supporting-surface-engaging portions can be associated with one of the at least one primary wheel member and the at least one secondary wheel member.

An obstacle traversing wheel assembly can have a primary wheel member mounted to a primary axis of rotation. An outer periphery of the primary wheel member can be capable of rolling engagement with a supporting surface. The primary wheel member can be supported by an axial pin or shaft. At least one secondary wheel member can be mounted having a common axis of rotation with respect to the primary axis of rotation. The at least one secondary wheel member can be separate from the primary wheel member. Five supporting-surface-engaging portions can be located on the at least one secondary wheel member and can extend radially outwardly beyond the outer periphery of the primary wheel member for enabling the obstacle traversing wheel assembly to traverse an obstacle by imparting climbing movement to the primary wheel member in response to engagement of at least one of the five supporting-surface-engaging portions of the at least one secondary wheel member with the obstacle.

An obstacle traversing wheel assembly can include a primary wheel member mounted with respect to a primary axis of rotation. The primary wheel member can have an outer periphery capable of rolling engagement with a supporting surface. At least one secondary wheel member can be mounted adjacent to the primary wheel member and axially offset with respect to the primary wheel member along the primary axis of rotation to provide independent coaxial rotation of the primary wheel member and the at least one secondary wheel member with respect to one another. Five supporting-surface-engaging portions can be located on the at least one secondary wheel member and can extend radially outwardly beyond the outer periphery of the primary wheel member for enabling the obstacle traversing wheel assembly to traverse an obstacle by imparting climbing movement to the primary wheel member in response to engagement of at least one of the five supporting-surface-engaging portions of the at least one secondary wheel member with the obstacle.

An obstacle traversing wheel assembly can include a primary wheel member mounted with respect to a primary axis of rotation and two secondary wheel members mounted with respect to a secondary axis of rotation. Each of the two secondary wheel members can have five supporting-surface-engaging protrusions. The primary axis of rotation can be located coaxial with the secondary axis of rotation. The secondary wheel members can extend vertically on each side of the primary wheel member and the secondary wheel members can rotate independent of one another or can be conjoined with one another for rotation as a unitary member. The five supporting-surface-engaging protrusions can enable the wheel assembly to traverse an obstacle by imparting climbing movement to the primary wheel member in response to engagement with the obstacle. The supporting-surface-engaging protrusions can include a rolling wheel member associated with each protrusion, such that each rolling wheel member rotates about a corresponding third axis of rotation.

The obstacle traversing wheel assembly can include a configuration having five primary wheel members, where each of the five primary wheel members rotates about a corresponding primary axis of rotation. A secondary wheel member can be mounted with respect to a secondary axis of rotation and can have five supporting-surface-engaging protrusions. The secondary wheel member can support the five primary wheel members in equally angularly spaced locations and at radially equal distances from the secondary axis of rotation. The secondary wheel member can enable the wheel assembly to traverse the obstacle by imparting climbing movement to the primary wheel members in response to engagement with the obstacle.

The wheel assembly can include a configuration having a swivel mount connecting each primary wheel member with respect to the secondary wheel member. The swivel mount can be a caster assembled to the secondary wheel member at radially equal distances from the secondary axis of rotation and at equally angularly spaced locations about the secondary axis of rotation. Each swivel mount can include an axis of rotation extending generally perpendicular to and offset from the secondary axis of rotation. In other words, the swivel axis of rotation can extend generally tangential to an imaginary circumference radially spaced from the second axis of rotation.

The obstacle traversing wheel assembly can be incorporated into various load carrying land vehicles, by way of example and not limitation, such as wheelchairs, intravenous (IV) dispensing devices, personal transport devices, or any other wheel-bearing device which can require traversing obstacles. Other applications of the present invention will become apparent to those skilled in the art when the following description of one mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

The following description is of one presently contemplated mode of carrying out the invention of an obstacle traversing wheel assembly, capable of incorporation in personal transportation devices, such as wheelchairs. The wheel assembly of the present invention is configured for travelling on substantially level surfaces, travelling on uneven surfaces, or climbing steps.

Figure 1A:
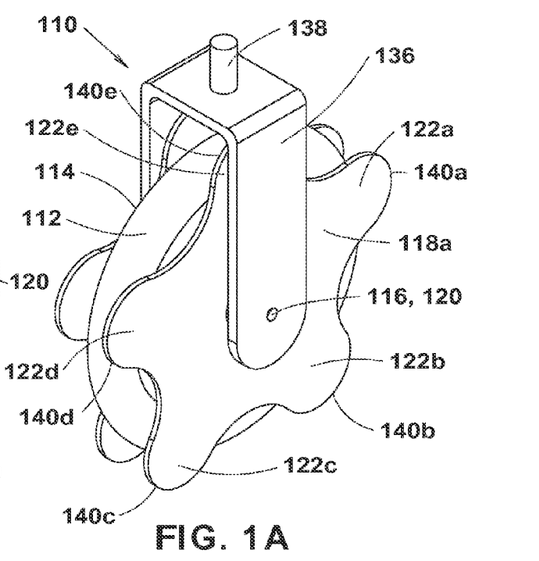
FIG. 1A is a side elevation view of an obstacle traversing wheel assembly having at least one primary wheel member and at least one secondary wheel member.

Referring now to FIGS. 1A-D, there is shown an obstacle traversing wheel assembly 110 having at least one primary wheel member 112 and at least one secondary wheel member 118. By way of example and not limitation, the illustrated configuration includes one primary wheel member 112 and one secondary wheel member 118. The secondary wheel member 118 can have two secondary wheel member portions 118a, 118b independently rotatable with respect to one another or connected to one another to rotate in unison as a single monolithic unitary member, independently of the primary wheel member 112. Primary wheel member 112 is capable of rolling on a supporting surface 146, such that an outer periphery 114 of primary wheel member 112 contacts and rolls along the supporting surface. As best seen in FIG. 1A, primary wheel member 112 can be interposed between two secondary wheel members 118a and 118b. Secondary wheel member 118 can have three or more protrusions 122. By way of example and not limitation, as illustrated each secondary wheel member 118 can include five protrusions 122a, 122b, 122c, 122d, 122e. Protrusions 122a-122e can have supporting-surface-engaging portions 140a, 140b, 140c, 140d, 140e extending along a portion of the outer periphery of each protrusion. Each supporting-surface-engaging portion 140 can make contact with an obstacle when in a lower forwardly facing position with respect to a direction of travel and after contacting the obstacle, can make contact with one or both the obstacle and supporting surface 146 during operation of obstacle traversing wheel assembly 110. By way of example and not limitation, as illustrated five protrusions 122a-122e can optimize the size of the obstacle which can be traversed while providing more structural support for the obstacle traversing wheel assembly 110 during traversing movement over an obstacle. The secondary wheel member 118 depicted in FIGS. 1A-C allows contact and/or sliding movement of the secondary wheel member 118 with respect to an obstacle simplifying the construction of the wheel assembly. In this manner, the secondary wheel member 118 does not require rolling wheel members 226 as illustrated in FIGS. 2A-2D, which can make the wheel assembly 110 more cost effective to produce. By way of example and not limitation, when the obstacle traversing wheel assembly 110 is configured to have five protrusions 122a-122e, each protrusion 122a-122e can be located at an angle of about 72 degrees from adjacent protrusions in equally angularly spaced locations with respect to the secondary axis of rotation for the secondary wheel member 118. Each protrusion 122a-e having a first portion disposed radially inward of the outer surface of the primary wheel member.

Figures 1B, 1C:
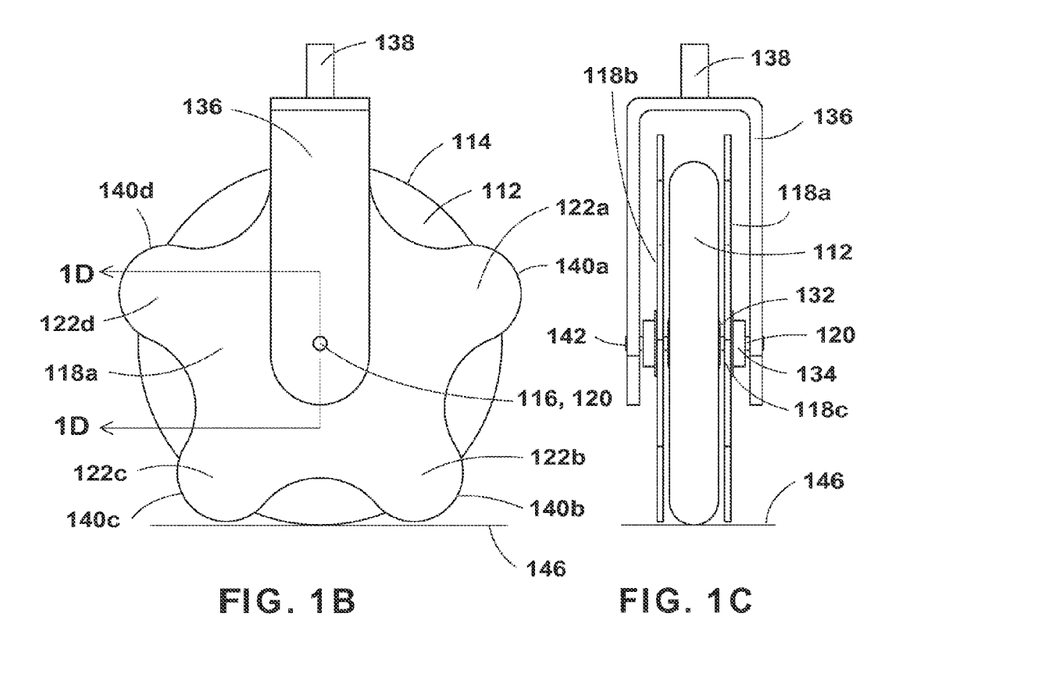
FIG. 1B is a side view of the wheel assembly shown in FIG. 1A.
FIG. 1C is a front view of the wheel assembly shown in FIG. 1A.
Figure 1D:
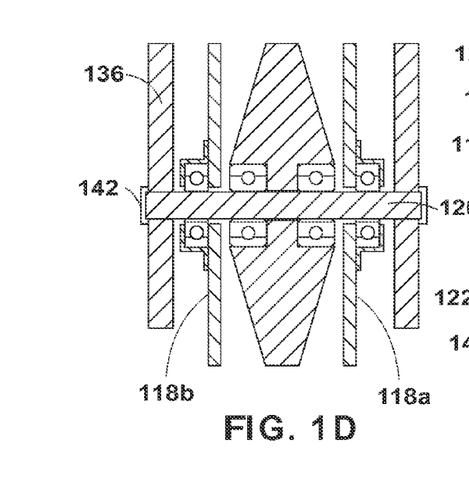
FIG. 1D is a cross sectional view of the wheel assembly of FIG. 1A taken as shown in FIG. 1B.

It should be recognized by those skilled in the art that secondary wheel members 118a, 118b can be attachable to a pre-existing primary wheel member 112. In this case, the secondary wheel member 118a, 118b can be coupled to an existing support shaft 120, which can couple the wheel assembly to an existing bracket 136. By way of example and not limitation, as depicted in FIG. 1C, the axial pin or support shaft 120 is sheathed within the sleeve portion 118c of the secondary wheel member 118a, 118b. The sleeve portion 118c of the secondary wheel member 118a, 118b can allow for free rotation of secondary wheel member 118a, 118b independently of the primary wheel member 112 and can reduce friction between the parts during movement relative to one another. As best seen in FIG. 1C, a first bearing surface 132 can be located between primary wheel member 112 and the sleeve portion 118c of the secondary wheel member 118a, 118b. A second bearing surface 134 can be located between the secondary wheel member 118a, 118b and the support shaft 120. The assembly 110 including secondary wheel member 118a, 118b, sleeve portion 118c, primary wheel member 112, and the support shaft 120 can be attached to a bracket 136 via a fastener 142. Bracket 136 can be affixed to a wheel bearing device, or load carrying vehicle, by way of example and not limitation, such as a wheelchair, via a swivel attachment post or bracket support shaft 138.

Primary wheel member 112 can rotate about a primary shaft 116 defining a primary axis of rotation and secondary wheel member 118a, 118b can rotate about a secondary shaft 120 defining secondary axis of rotation. The primary wheel member 112 can rotate about an axis of rotation parallel to an axis of rotation of the secondary wheel member 118a, 118b. By way of example and not limitation, as illustrated in FIGS. 1A-1D, the primary shaft 116 defining the primary axis of rotation can be located coaxial with the secondary axis of rotation defined by the secondary shaft 120. In other words, as illustrated in FIGS. 1A-1D, the primary shaft 116 and secondary shaft 120 can be the same common shaft defining a coaxial common axis of rotation for the primary wheel member 112 and secondary wheel member 118a, 118b. Secondary wheel member 118a, 118b can rotate uniformly and independently from primary wheel member 112. As best seen in FIG. 1B, an outer periphery 114 of the primary wheel member 112 can be located at a radial distance from primary axis of rotation of primary shaft 116. Protrusions 122a-122e can extend radially outwardly beyond the outer periphery 114 of the primary wheel member 112. Secondary wheel members 118a, 118b can rotate when the primary wheel member 112 rolls one of the outwardly extending protrusions 122a-122e into contact with an obstacle. The secondary wheel member 118a, 118b begins to rotate about the secondary axis of rotation in response to contact with the obstacle and continued movement of the wheel assembly toward the obstacle, thereby imparting a vertical climbing motion or catapulting action to the primary wheel member 112 enabling the obstacle traversing wheel assembly 110 to traverse the obstacle. Secondary wheel member 118a, 118b can have a non-circular shape with a plurality of non-tangential peripheral surface portions. By way of example and not limitation, as illustrated in FIGS. 1A-1C, secondary wheel member 118a, 118b can be a star-shaped member having protrusions 122a-122e located in equally angularly spaced locations and at radially equal distances from the secondary wheel member support shaft 120 defining the secondary axis of rotation.

The term "obstacle" as used herein is defined as any physical structure which has a vertical height elevated from the height of a substantially level surface on which the wheel-bearing device or load carrying vehicle travels. Obstacles can include, but are not limited to, rocks, ridges, bumps, curbs, or other physical obstructions which can not be traversed by the normal rolling motion of the primary wheel member without some type of additional assistance to elevate the primary wheel vertically. The wheel assembly 110 can be configured to not only traverse obstacles, but also to climb steps of elevated heights. Protrusions 122a-122e can be located on secondary wheel member portions 118a and 118b to catapult the obstacle traversing wheel assembly 110 in a vertical direction in response to engagement with the obstacle.

While traveling on a substantially level surface, the secondary wheel member 118a, 118b can be located in an angular position with respect to the primary wheel member 112, such that protrusions 122 extend outwardly without engaging the supporting surface 146 on which the primary wheel is in rolling contact. After contact with an obstacle having a higher vertical height than the supporting surface 146, one of the supporting-surface-engaging portions 140a-140e located on a corresponding one of the protrusions 122a-122e can act as a lever about which the obstacle traversing wheel assembly 110 rotates over the obstacle. Protrusions 122a-122e minimize the force and torque required to traverse an obstacle. After traversing the obstacle, the supporting-surface-engaging portions 140a-140e can return to a neutral or non-engagement orientation or position, where the protrusion 140a-140e can extend outwardly without engaging the supporting surface 146 as the wheel assembly travels along the substantially level surface with the primary wheel member 112 in rolling contact with the supporting surface 146.

Figures 2A, 2D:
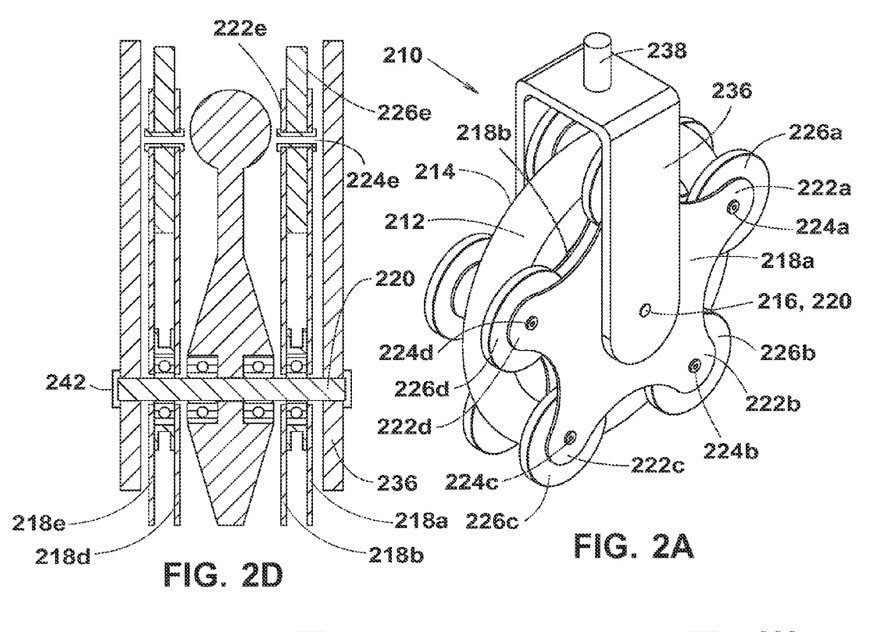
FIG. 2A is a side elevation view of the wheel assembly from FIG. 1A with rolling wheel members located adjacent an outer radial end of each supporting-surface-engaging protrusion of the secondary wheel member.
FIG. 2D is a cross sectional view of the wheel assembly of FIG. 2A taken as shown in FIG. 2B.
Figure 2B:
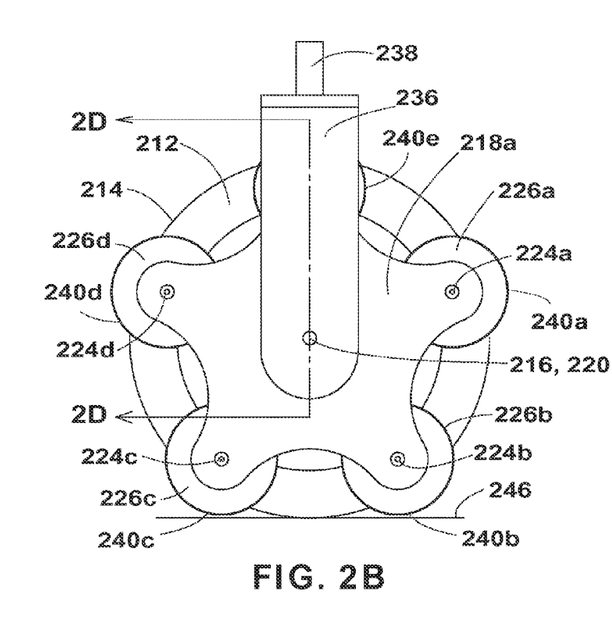
FIG. 2B is a side view of the wheel assembly shown in FIG. 2A.

Referring now to FIGS. 2A-2D, an obstacle traversing wheel assembly 210 can include protrusions 222a, 222b, 222c, 222d, and 222e with a plurality of rolling wheel members 226a, 226b, 226c, 226d, and 226e. One rolling wheel member 226a-226e can be supported adjacent to a radially outwardly extending end of each corresponding protrusion 222a-222e for rotation about a corresponding third shaft 224a, 224b, 224c, 224d, and 224e defining a third axis of rotation extending parallel to and radially spaced from the primary shaft 216 defining the primary axis of rotation and the secondary shaft 220 defining the secondary axis of rotation. As illustrated in FIGS. 2A-2D, the rolling wheel members 226a-226e can rotate about corresponding third shafts 224a-224e defining third axes of rotation. Rolling wheel members 226a-226e can catapult the obstacle traversing wheel assembly 210 in a vertical direction in response to engagement with the obstacle as previously described with respect to the protrusions 222a-222e. In this case the rolling wheel members 226a-226e allow rolling contact with the obstacle rather than the sliding or stationary contact of the supporting-surface-engaging portions (or more accurately obstacle-surface-engaging portions) 240a, 240b, 240c, 240d, and 240e. Secondary wheel member 218a, 218b or 218d, 218e can have a non-circular shape with a plurality of non-tangential peripheral surface portions. By way of example and not limitation, as illustrated in FIGS. 2A-2B, secondary wheel member 218a, 218b or 218d, 218e can be a star-shaped member having protrusions 222a-222e located in equally angularly spaced locations and at radially equal distances from the secondary wheel member support shaft 220 defining the secondary axis of rotation.

Figure 2C:
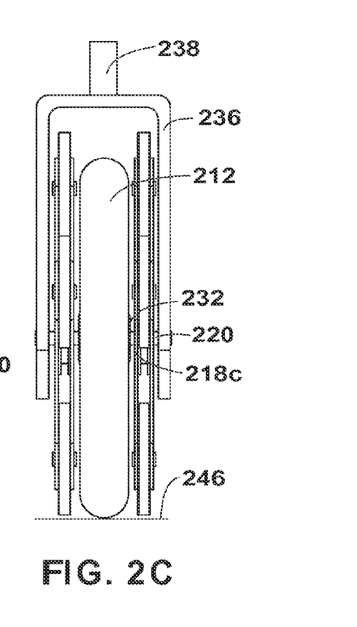
FIG. 2C is a front view of the wheel assembly shown in FIG. 2A.

It should be recognized by those skilled in the art that secondary wheel members 218a and 218b, 218d and 218e can be attachable to a pre-existing primary wheel member 212. In this case, the secondary wheel member 218a and 218b, 218d and 218e can be coupled to an existing support shaft 220, which can couple the wheel assembly to an existing bracket 236. By way of example and not limitation, as depicted in FIG. 2C, the axial pin or support shaft 220 is sheathed within the sleeve portion 218c of the secondary wheel member 218a and 218b, 218d and 218e. The sleeve portion 218c of the secondary wheel member 218a and 218b, 218d and 218e can allow for free rotation of secondary wheel member 218a and 218b, 218d and 218e independently of the primary wheel member 212 and can reduce friction between the parts during movement relative to one another. As best seen in FIG. 2C, a first bearing surface 232 can be located between primary wheel member 212 and the sleeve portion 218c of the secondary wheel member 218a and 218b, 218d and 218e. The support shaft 220 can be attached to a bracket 236 via a fastener 242. Bracket 236 can be affixed to a wheel bearing device, or load carrying vehicle, by way of example and not limitation, such as a wheelchair, via a swivel attachment post or bracket support shaft 238.

Figures 3A, 3D:
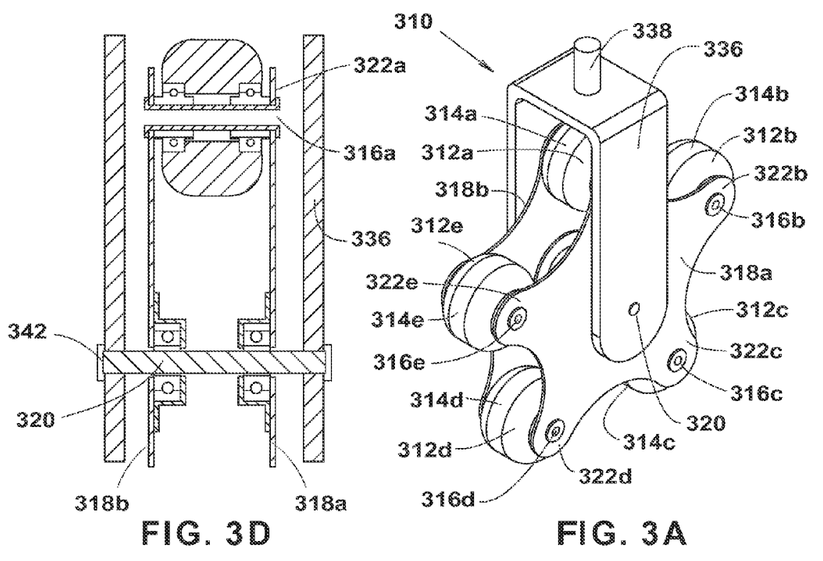
FIG. 3A is a side elevation view of the wheel assembly having five primary wheel members supported for rotation by at least one secondary wheel member.
FIG. 3D is a cross sectional view of the wheel assembly of FIG. 3A taken as shown in FIG. 3B.
Figure 3B:
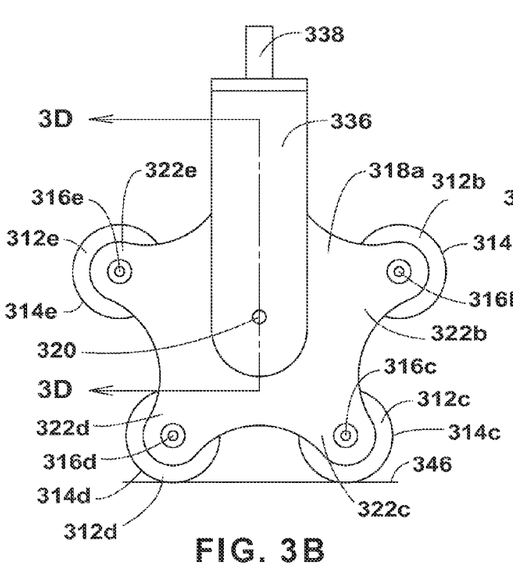
FIG. 3B is a side view of the wheel assembly shown in FIG. 3A.
Figure 3C:
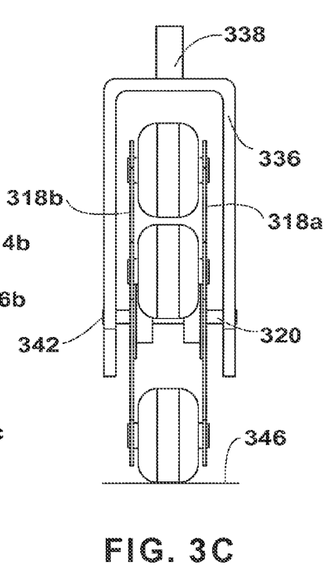
FIG. 3C is a front view of the wheel assembly shown in FIG. 3A.

Referring now to FIGS. 3A-3D, an obstacle traversing wheel assembly 310 can include a plurality of primary wheel members 312a, 312b, 312c, 312d, 312e capable of rolling engagement with a supporting surface 346. The secondary wheel member 318a, 318b can provide a rotational climbing function. The size of the primary wheels 312a-312e are indirectly proportional to the distance between the contact points of the traversing wheel assembly 310, hence, smaller primary wheels 312a-312e provide greater distance between the contact points of the obstacle traversing wheel assembly 310 and the obstacle. A greater distance between contact points of the traversing wheel assembly allows the secondary wheel 318a, 318b to have a greater turning radius. By way of example and not limitation, one configuration of an obstacle traversing assembly 310 can include the primary wheel members 312a-312e having a 2 inch diameter dimension to be mounted on an 8 inch diameter dimension for the secondary wheel member 318a, 318b of the obstacle traversing wheel assembly 310. Primary wheel members 312a-312e can each rotate about primary shafts 316a, 316b, 316c, 316d, 316e defining separate individual primary axes of rotation. As shown in FIGS. 3A-3C, secondary wheel member 318a, 318b can include first 318a and second portions 318b for supporting the primary wheel members 312a-312e in equal angularly spaced locations and at radially equal distances from a secondary wheel support shaft 320 defining a secondary axis of rotation. Primary wheel support shafts 316a-316e defining separate individual axes of rotation and can be located parallel to and offset from the secondary wheel member support shaft 320 defining the secondary axis of rotation. Primary wheel members 312a-312e can catapult the obstacle traversing wheel assembly 310 in a vertical direction in response to engagement with an obstacle. The obstacle traversing wheel assembly 310 can provide a secondary wheel member 318a, 318b having at least one portion 318a or 318b located on either side of the primary wheel members 312a-312e to reduce any twisting or pivoting movement of primary wheel members 312a-312e which could cause the wheel-bearing device or load carrying vehicle to lose alignment with the direction of travel, potentially tipping the wheel-bearing device or load carrying vehicle. The support shaft 320 can be attached to a bracket 336 via a fastener 342. A bracket 336 can be affixed to a wheel bearing device, or load carrying vehicle, by way of example and not limitation, such as a wheelchair, via a swivel attachment post or bracket support shaft 338. Secondary wheel member 318a, 318b can have a non-circular shape with a plurality of non-tangential peripheral surface portions. By way of example and not limitation, as illustrated in FIGS. 3A-3B, secondary wheel member 318a, 318b can be a star-shaped member having protrusions 322a, 322b, 322c, 322d, 322e located in equally angularly spaced locations and at radially equal distances from the secondary wheel member support shaft 320 defining the secondary axis of rotation.

Figure 4A:
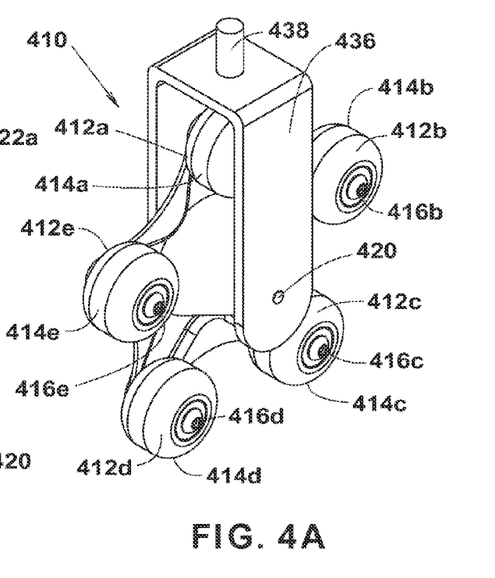
FIG. 4A is a side elevation view of the wheel assembly shown in FIG. 3A having one secondary wheel member.
Figures 4B, 4C:
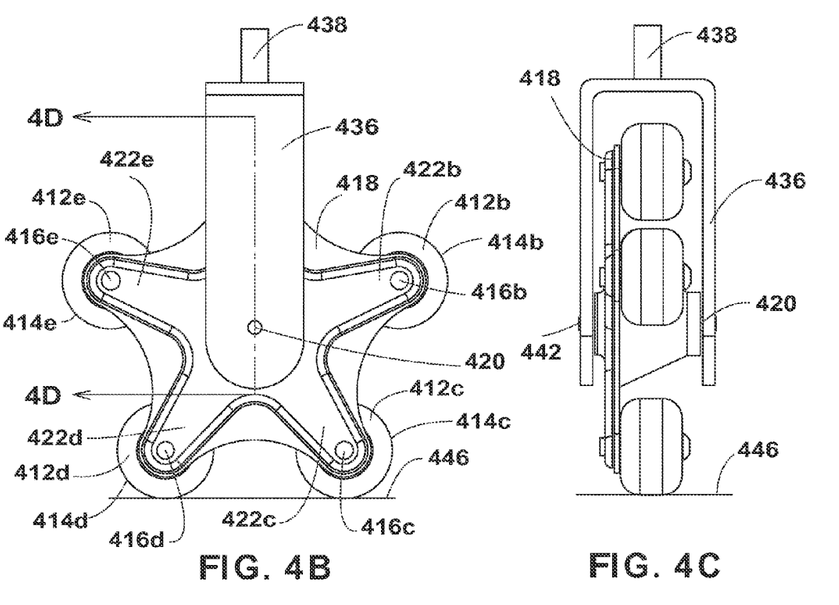
FIG. 4B is a side view of the wheel assembly shown in FIG. 4A.
FIG. 4C is a front view of the wheel assembly shown in FIG. 4A.
Figure 4D:
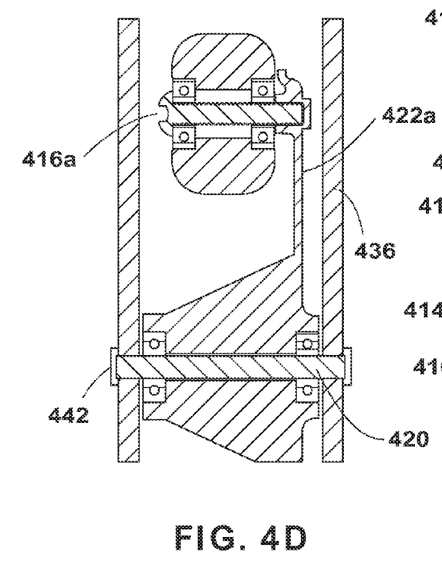
FIG. 4D is a cross sectional view of the wheel assembly of FIG. 4A taken as shown in FIG. 4B.

Referring now to FIGS. 4A-4D an obstacle traversing wheel assembly 410 can include a plurality of primary wheel members 412a, 412b, 412c, 412d, 412e and a secondary wheel member 418 having one portion located on one side of the primary wheel members 412a-412e. The secondary wheel member 418 can support the primary wheel members 412a-412e from a single side in a cantilevered fashion with the primary shafts 416a, 416b, 416c, 416d, 416e. By way of example and not limitation, the illustrated configuration includes a robust secondary wheel member 418 and can include stiffening ribs or webs as required to achieve the desired rigidity of the part. The secondary wheel member 418 can provide a rotational climbing function. Primary wheel members 412a-412e can each rotate about primary shafts 416a-416e defining separate individual primary axes of rotation. Primary wheel support shafts 416a-416e defining separate individual axes of rotation and can be located parallel to and offset from the secondary wheel member support shaft 420 defining the secondary axis of rotation. Primary wheel members 412a-412e can catapult the obstacle traversing wheel assembly 410 in a vertical direction in response to engagement with an obstacle. The support shaft 420 can be attached to a bracket 436 via a fastener 442. A bracket 436 can be affixed to a wheel bearing device, or load carrying vehicle, by way of example and not limitation, such as a wheelchair, via a swivel attachment post or bracket support shaft 438. Secondary wheel member 418 can have a non-circular shape with a plurality of non-tangential peripheral surface portions. By way of example and not limitation, as illustrated in FIGS. 4A-4B, secondary wheel member 418 can be a star-shaped member having protrusions 422a, 422b, 422c, 422d, 422e located in equally angularly spaced locations and at radially equal distances from the secondary wheel member support shaft 420 defining the secondary axis of rotation.

Figure 5A:
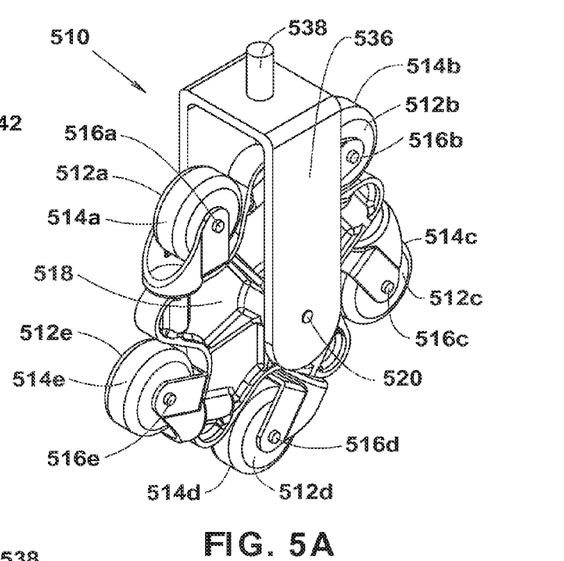
FIG. 5A is a side elevation view of the wheel assembly shown in FIG. 3A having swivel mounts connectors.
Figure 5B:
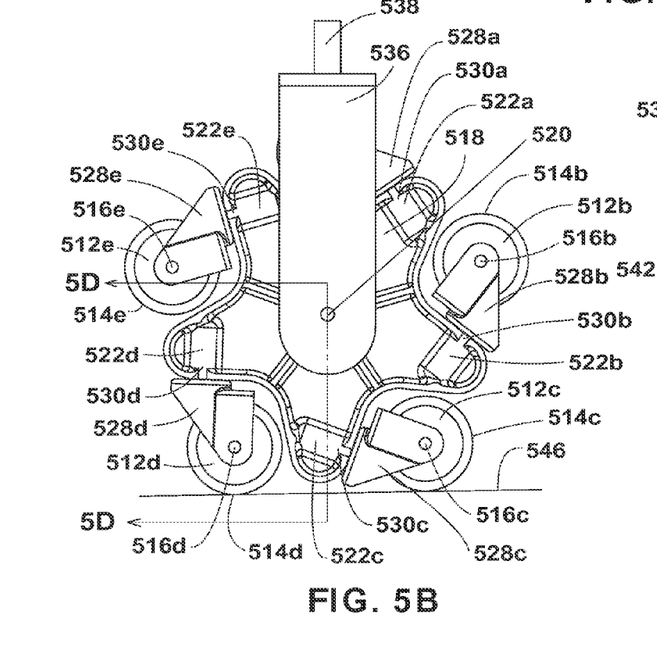
FIG. 5B is a side view of the wheel assembly shown in FIG. 5A.
Figure 5C:
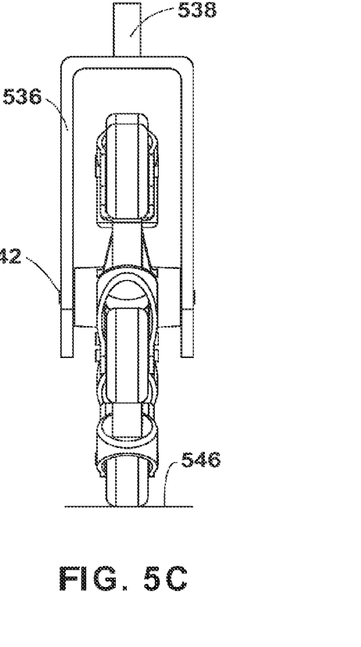
FIG. 5C is a front view of the wheel assembly shown in FIG. 5A.
Figure 5D:
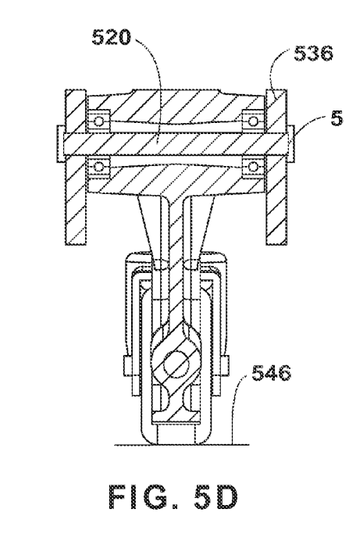
FIG. 5D is a cross sectional view of the wheel assembly of FIG. 5A taken as shown in FIG. 5B.

Referring now to FIGS. 5A-5D, an obstacle traversing wheel assembly 510 can include a plurality of primary wheel members 512a, 512b, 512c, 512d, 512e connected to a secondary wheel member 518 via separate individual swivel mounts 528a, 528b, 528c, 528d, 528e. The secondary wheel member 518 can include protrusions 522a, 522b, 522c, 522d, 522e. One of the plurality of primary wheel members 512a-512e can be connected to each corresponding protrusion 522a-522e via a separate individual swivel mounts 528a-528e. The swivel mounts 528a-528e permit each corresponding primary wheel members 512a-512e to rotate on a corresponding swivel axes of rotation 530a, 530b, 530c, 530d, and 530e. The swivel axes of rotation 530a-530e can be located in equally angularly spaced locations and at radially equal distances from the secondary shaft 520 defining the secondary axis of rotation. The swivel axes of rotation 530a-530e can be perpendicular to and skewed from each corresponding primary shaft defining the corresponding primary axes of rotation 516a, 516b, 516c, 516d, 516e. The swivel axes of rotation 530a-530e can be perpendicular to and skewed from the secondary shaft 520 defining the corresponding secondary axes of rotation. In other words, the swivel axes of rotation 530a-530e can be mounted on a surface non-tangential to the secondary shaft 520 defining the secondary axes of rotation. By way of example and not limitation, the swivel mounts 528a-528e can be defined by a caster. The wheel assembly 510 of FIGS. 5A-5D provides an additional degree of freedom as a result of the swivel mounts 528a-528e. This allows the wheel-bearing device or load carrying vehicle to travel in a different direction while traversing the obstacle rather than being limited to traveling linearly during traversal of the obstacle. The secondary support shaft 520 can be attached to a bracket 536 via a fastener 542. A bracket 536 can be affixed to a wheel bearing device, or load carrying vehicle, by way of example and not limitation, such as a wheelchair, via a swivel attachment post or bracket support shaft 538. Secondary wheel member 518 can have a non-circular shape with a plurality of non-tangential peripheral surface portions. By way of example and not limitation, as illustrated in FIGS. 5A-5B, secondary wheel member 518 can be a star-shaped member having protrusions 522a-522e located in equally angularly spaced locations and at radially equal distances from the secondary wheel member support shaft 520 defining the secondary axis of rotation.

Figure 6:
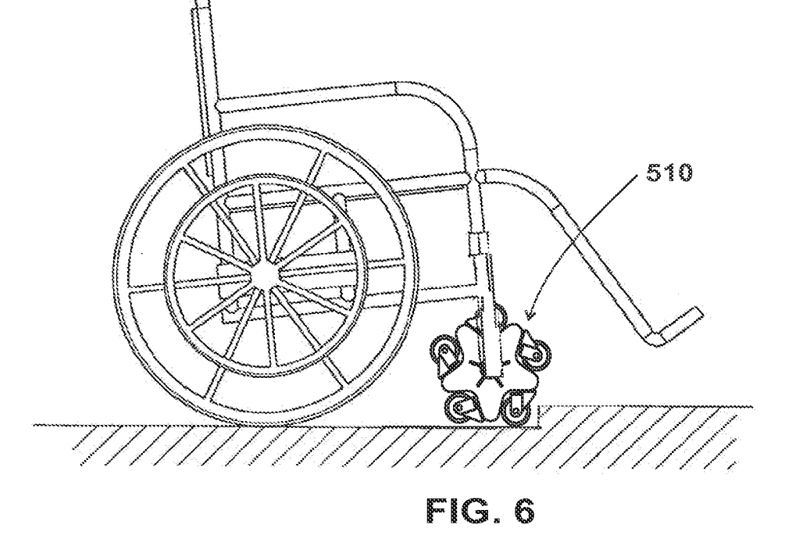
FIG. 6 is a perspective view of the obstacle traversing wheel assembly in combination with a wheelchair.

Referring now to FIG. 6, the obstacle traversing wheel assembly 110, 210, 310, 410, 510 can be used in combination with a wheel chair device. In this configuration, the wheel chair is capable of ascending or descending stairs, curbs, or other vertically extending obstacles that would normally impair travel of a conventional wheel across a non-planar supporting surface. It should be recognized that any of the disclosed wheel assembly configurations can be used in combination with a wheel chair to permit traverse over vertically extending obstacles of varying height. In this manner, a stable operating configuration having at least four points of contact is provided while climbing an obstacle to minimize the likelihood of tipping an occupant out of the wheel chair. The wheel assembly 110, 210, 310, 410, 510 can have a simple structure in order to be manufactured at a lower cost than compared to other alternative devices.

It should be recognized that the secondary wheel members 118a, 118b or 218a, 218b and 218d, 218e of FIGS. 1A-1D or 2A-2D can be manufactured as an add-on assembly for existing wheel structures. The add-on kit can include the secondary wheel members 118a, 118b or 218a, 218b and 218d, 218e and fasteners 142, 242 for attachment to an existing support pin or shaft 120, 220 of the existing wheel structure. In this manner, the secondary wheel members 118a, 118b or 218a, 218b and 218d, 218e can be attached to the existing support pin or shaft 120, 220 of the existing wheel assembly for rotation in response to contact with an obstacle to obtain the desired climbing action over an obstacle. As previously described, the outer peripheral surface 140a-140e of the secondary wheel member 118a, 118b, as best seen in FIGS. 1A-1D, or the rolling members 226a-226e attached thereto, best seen in FIGS. 2A-2D extend beyond the outer periphery or circumference of the primary wheel member 112, 212 to allow catapulting action in response to contact with a vertically extending obstacle.

In operation, the wheel assembly 110, 210 uses the primary wheel member 112, 212 to roll along the supporting surface 146, 246 until contact is made with an obstacle. In the configuration of FIG. 1A-1D, the secondary wheel member 118a, 118b can contact the obstacle and begin to rotation. Rotation of the secondary wheel member 118a, 118b catapults the primary wheel vertically with respect to the obstacle. If the obstacle is vertically higher, another protrusion 122a-122e of the secondary wheel member 118a, 118b can contact the obstacle to catapult the primary wheel 112 vertically higher. After the summit of the obstacle is obtained by the climbing action of the secondary wheel member 118a, 118b, the primary wheel 112 can contact the supporting surface 146 and roll in a normal fashion. When traversing generally flat planar surfaces, the primary wheel 112 supports the assembly 110 and the second wheel member 118a, 118b is in a position as shown in FIG. 1B not contact the supporting surface 146.

Similarly, with respect to FIGS. 2A-2D, the wheel assembly 210 uses the primary wheel member 212 to roll along the supporting surface 246, such that an outer periphery 214 of the primary wheel member 212 contacts and rolls along the supporting surface 246 until contact is made with an obstacle. The secondary wheel member 218a, 218b and 218d, 218e can then contact the obstacle with a rolling member 226a-226e and the secondary wheel member 218a, 218b and 218d, 218e can begin to rotation as the rolling member 226a-226e rotates along the obstacle. Rotation of the secondary wheel member 218a, 218b and 218d, 218e catapults the primary wheel 212 vertically with respect to the obstacle. If the obstacle is vertically higher, another protrusion 222a-222e of the secondary wheel member 218a, 218b and 218d, 218e can contact the obstacle with another rolling member 226a-226e to further catapult the primary wheel 212 vertically higher. After the summit of the obstacle is obtained by the climbing action of the secondary wheel member 218a, 218b and 218d, 218e, the primary wheel 212 can contact the supporting surface 246 and roll in a normal fashion. When traversing generally flat planar surfaces, the primary wheel 212 supports the assembly 210 and the second wheel member 218a, 218b and 218d, 218e is in a position as shown in FIG. 2B not in contact with the supporting surface 246.

Referring again to FIGS. 3A-3D and 4A-4D, in operation the wheel assembly 310, 410 uses the primary wheel member 312a-312e, 412a-412e to roll along the supporting surface, 446, such that an outer periphery 314a, 314b, 314c, 314d, 314e, 414a, 414b, 414c, 414d, 414e of the primary wheel member 312a-312e, 412a-412e contacts and rolls along the supporting surface 346, 446 until contact is made with an obstacle. After one of the primary wheel members 312a-312e, 412a-412e contacts the obstacle, then the secondary wheel member 318a-318b, 418 can begin to rotate, as the primary wheel member 312a-312e, 412a-412e rotates along the obstacle. Rotation of the secondary wheel member 318a-318b, 418 catapults the other primary wheel members 312a-312e, 412a-412e vertically with respect to the obstacle. If the obstacle is vertically higher, another protrusion 322a-322e, 422a-422e of the secondary wheel member 318a-318b, 418 can rotationally present another primary wheel member 312a-312e, 412a-412e for contact with the obstacle to further catapult the primary wheel 312a-312e, 412a-412e vertically higher. After the summit of the obstacle is obtained by the climbing action of the secondary wheel member 318a-318b, 418, the primary wheel members 312a-312e, 412a-412e can contact the supporting surface 346, 446 and roll in a normal fashion. When traversing generally flat planar surfaces, the primary wheel members 312a-312e, 412a-412e support the assembly 310, 410 and the second wheel member 318a-318b, 418 as shown in FIGS. 3B and 4B.

Referring now to FIGS. 5A-5D, in operation the wheel assembly 510 uses the primary wheel member 512a-512e to roll along the supporting surface 546, such that an outer periphery 514a, 514b, 514c, 514d, 514e of the primary wheel member 512a-512e contacts and rolls along the supporting surface 546 until contact is made with an obstacle. After one of the primary wheel members 512a-512e contacts the obstacle, then the secondary wheel member 518 can begin to rotation, as the primary wheel member 512a-512e rotates along the obstacle. Rotation of the secondary wheel member 518 catapults the other primary wheel members 512a-512e vertically with respect to the obstacle. If the obstacle is vertically higher, another protrusion 522a-522e of the secondary wheel member 518 can rotationally present another primary wheel member 512a-512e for contact with the obstacle to further catapult the primary wheel 512a-512e vertically higher. After the summit of the obstacle is obtained by the climbing action of the secondary wheel member 518, the primary wheel members 512a-512e can contact the supporting surface 546 and roll in a normal fashion. When traversing generally flat planar surfaces, the primary wheel members 512a-512e support the assembly 510 and the second wheel member 518 as shown in FIG. 5B.

Figures 7, 8:
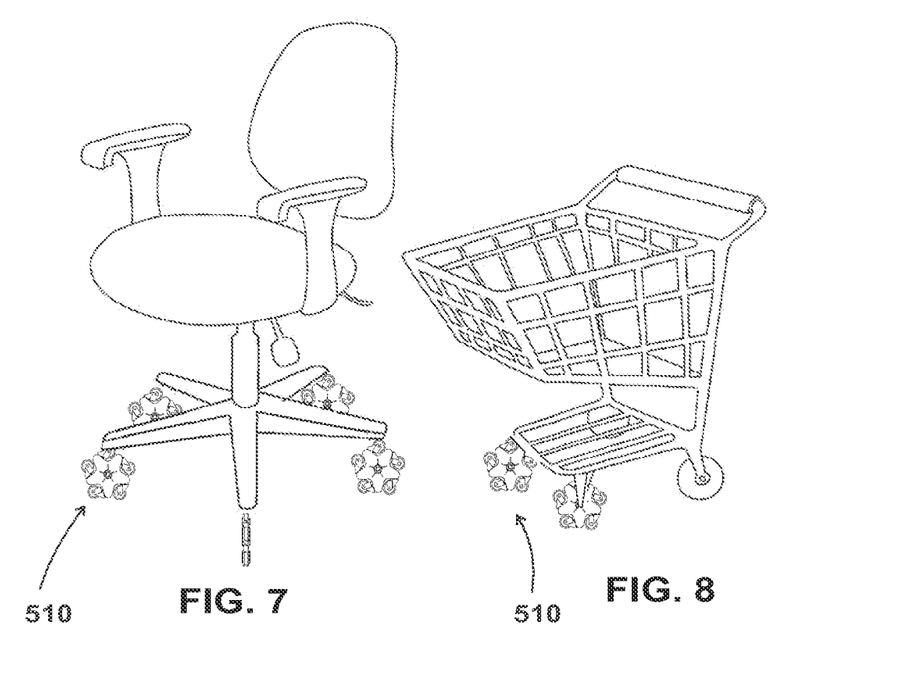
FIG. 7 is a perspective view of the obstacle traversing wheel assembly in combination with wheel-bearing furniture.
FIG. 8 is a perspective view of the obstacle traversing wheel assembly in combination with a wheel-bearing device or load carrying vehicle.

Referring now to FIG. 7, the obstacle traversing wheel assembly 110, 210, 310, 410, 510 can be used in combination with wheel-bearing furniture. In this configuration, the wheel bearing furniture is capable of ascending or descending cords, mats, or other vertically extending obstacles that would normally impair travel of a conventional wheel across a non-planar supporting surface. It should be recognized that any of the disclosed wheel assembly configurations can be used in combination with wheel-bearing furniture to permit traverse over vertically extending obstacles of varying height.

Referring now to FIG. 8, the obstacle traversing wheel assembly 110, 210, 310, 410, 510 can be used in combination with another wheel-bearing device or load carrying vehicle. In this configuration, the load carrying vehicle is capable of ascending or descending stairs, curbs, or other vertically extending obstacles that would normally impair travel of a conventional wheel across a non-planar supporting surface. It should be recognized that any of the disclosed wheel assembly configurations can be used in combination with a load carrying vehicle to permit traverse over vertically extending obstacles of varying height.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An obstacle traversing wheel assembly comprising:
   at least one primary wheel member, each primary wheel member rotatably mounted with respect to a primary axis of rotation, and capable of rolling engagement with a supporting surface;
   at least one secondary wheel member rotatably mounted with respect to the primary axis of rotation, wherein the at least one primary wheel member rotates independently of the at least one secondary wheel member; and
   at least five obstacle-engaging portions disposed on the at least one secondary wheel member for enabling the obstacle traversing wheel assembly to traverse an obstacle by imparting climbing movement to the at least one primary wheel member in response to engagement with the obstacle.

2. The obstacle traversing wheel assembly of claim 1, wherein each of the at least five obstacle-engaging portions include a rolling wheel member, each rolling wheel member having a secondary axis of rotation parallel to and radially spaced from the primary axis of rotation.

3. The obstacle traversing wheel assembly of claim 1, wherein the at least one primary wheel member further comprises a single primary wheel member and the at least one secondary wheel member further comprises a first secondary wheel member, and the first secondary wheel member is mounted adjacent to the single primary wheel member, such that the primary wheel member and secondary wheel member are rotatable parallel to one another and offset from one another along the primary axis of rotation.

4. The obstacle traversing wheel assembly of claim 1, wherein the at least one primary wheel member further comprises a single primary wheel member and the at least one secondary wheel member further comprises first and second secondary wheel members, and the first and second secondary wheel members are mounted adjacent to each side of the single primary wheel member, such that the single primary wheel member is interposed between the first and second secondary wheel members allowing the primary wheel member and secondary wheel members to rotate parallel to one another while being offset from one another along the primary axis of rotation, and the first and second secondary wheel members rotatable independently of one another, and independently of the single primary wheel member.

5. The obstacle traversing wheel assembly of claim 1 further comprising:
   an outer periphery of the at least one primary wheel member located at a radial distance from the primary axis; and
   the obstacle-engaging portions of the at least one secondary wheel member extending beyond the outer periphery of the at least one primary wheel member.

6. The obstacle traversing wheel assembly of claim 1, wherein the at least one secondary wheel member rotates when the at least one primary wheel member encounters the obstacle, such that the at least one secondary wheel member imparts vertical climbing motion to the at least one primary wheel member in response to engagement of the at least one secondary wheel member with the obstacle.

7. The obstacle traversing wheel assembly of claim 1, wherein the at least five obstacle-engaging portions are disposed on the secondary wheel member such that they extend beyond the outer periphery of the primary wheel member, wherein the primary wheel member is configured to roll on a supporting surface and the at least five obstacle-engaging portions are configured to traverse an obstacle in response to one of the five obstacle-engaging portions engaging the obstacle.

8. In an obstacle traversing wheel assembly having a primary wheel member mounted to a primary axis of rotation, an outer periphery of the primary wheel member capable of rolling engagement with a supporting surface, the primary wheel member supported by an axial pin, the improvement comprising:
  at least one secondary wheel member mounted having a common axis of rotation with respect to the primary axis of rotation, the at least one secondary wheel member separate from the primary wheel member; and
  five supporting-surface-engaging portions located on the at least one secondary wheel member and extending radially outwardly beyond the outer periphery of the primary wheel member for enabling the obstacle traversing wheel assembly to traverse an obstacle by imparting climbing movement to the primary wheel member in response to engagement of at least one of the five supporting-surface-engaging portions of the at least one secondary wheel member with the obstacle.

9. The improvement of claim 8, wherein the at least one secondary wheel member is attachable to the obstacle traversing wheel assembly by the axial pin.

10. The improvement of claim 9, wherein the primary wheel member rotates independently of the at least one secondary wheel member, such that at least one of the five supporting-surface-engaging portions of the at least one secondary wheel member catapult the obstacle traversing wheel assembly in a vertical direction in response to engagement with the obstacle.

11. The improvement of claim 8, wherein each of the five supporting-surface-engaging portions include a rolling wheel member, each rolling wheel member having a third axis of rotation parallel to and radially spaced from the primary and secondary axes of rotation, wherein the primary wheel member rotates independently of the at least one secondary wheel member, such that the rolling wheel member of at least one of the five supporting-surface-engaging portions of the at least one secondary wheel member catapults the obstacle traversing wheel assembly in a vertical direction in response to engagement with the obstacle.

12. The improvement of claim 8, wherein the at least one secondary wheel member further comprises a first secondary wheel member, and the first secondary wheel member is mounted adjacent to the primary wheel member, such that the primary wheel member and the first secondary wheel member are rotatable parallel to one another and offset from one another along the common axis of rotation.

13. The improvement of claim 8, wherein the at least one secondary wheel member further comprises first and second secondary wheel members, and the first and second secondary wheel members are mounted adjacent to each side of the primary wheel member, such that the primary wheel member is interposed between the first and second secondary wheel members allowing the primary wheel member and the first and second secondary wheel members to rotate parallel to one another while being offset from one another along the common axis of rotation, and the first and second secondary wheel members rotatable independently with respect to one another and independently of the primary wheel member.

14. The improvement of claim 8 further comprising:
  the outer periphery of the primary wheel member located at a radial distance from the primary axis of rotation; and
  the supporting-surface-engaging portions of the at least one secondary wheel member extending beyond the outer periphery of the primary wheel member.

15. An obstacle traversing wheel assembly comprising:
  a primary wheel member mounted with respect to a primary axis of rotation, the primary wheel member having an outer periphery capable of rolling engagement with a supporting surface;
  at least one secondary wheel member mounted adjacent to the primary wheel member and axially offset with respect to the primary wheel member along the primary axis of rotation to provide independent coaxial rotation of the primary wheel member and the at least one secondary wheel member with respect to one another; and
  five supporting-surface-engaging portions, each having an outer periphery, the five supporting-surface-engaging portions located on the at least one secondary wheel member and extending radially outwardly beyond the outer periphery of the primary wheel member for enabling the obstacle traversing wheel assembly to traverse an obstacle by imparting climbing movement to the primary wheel member in response to engagement of at least one of the five supporting-surface-engaging portions of the at least one secondary wheel member with the obstacle.

16. The obstacle traversing wheel assembly of claim 15, wherein the five supporting-surface-engaging portions are uniformly distributed about the primary axis of rotation.

17. The obstacle traversing wheel assembly of claim 15, wherein at least a portion of the outer periphery of each of the five supporting-surface-engaging portions is located beyond the outer periphery of the primary wheel member.

18. An obstacle traversing wheel assembly comprising:
  a primary wheel member pivotally attached to a bracket, the primary wheel member having a primary axis of rotation about a first axis and an outer surface capable of rolling engagement with a supporting surface; and
  a secondary wheel member pivotally attached to the bracket, the secondary wheel member having a plurality of relatively rigid, fixed protrusions evenly spaced about the secondary wheel member, each protrusion having a first portion disposed radially inward of the outer surface of the primary wheel member and an obstacle-engaging portion disposed radially outward of the primary wheel member, the secondary wheel member having a secondary axis of rotation about a second axis substantially vertically aligned with the first axis, the primary wheel member being independently rotatable relative to the secondary wheel member;
  each of the obstacle-engaging portions enabling the obstacle traversing wheel assembly to traverse an obstacle by imparting climbing movement to the primary wheel member in response to engagement with the obstacle.

19. The obstacle traversing wheel assembly of claim 18, wherein the obstacle-engaging portions define an undulating outer peripheral profile.

20. The obstacle traversing wheel assembly of claim 18, wherein the plurality of evenly spaced obstacle-engaging portions comprise at least five evenly spaced obstacle-engaging portions.

21. The obstacle traversing wheel assembly of claim 18, wherein the secondary axis and primary axis are coaxial.

* * * * *